Figure 1:
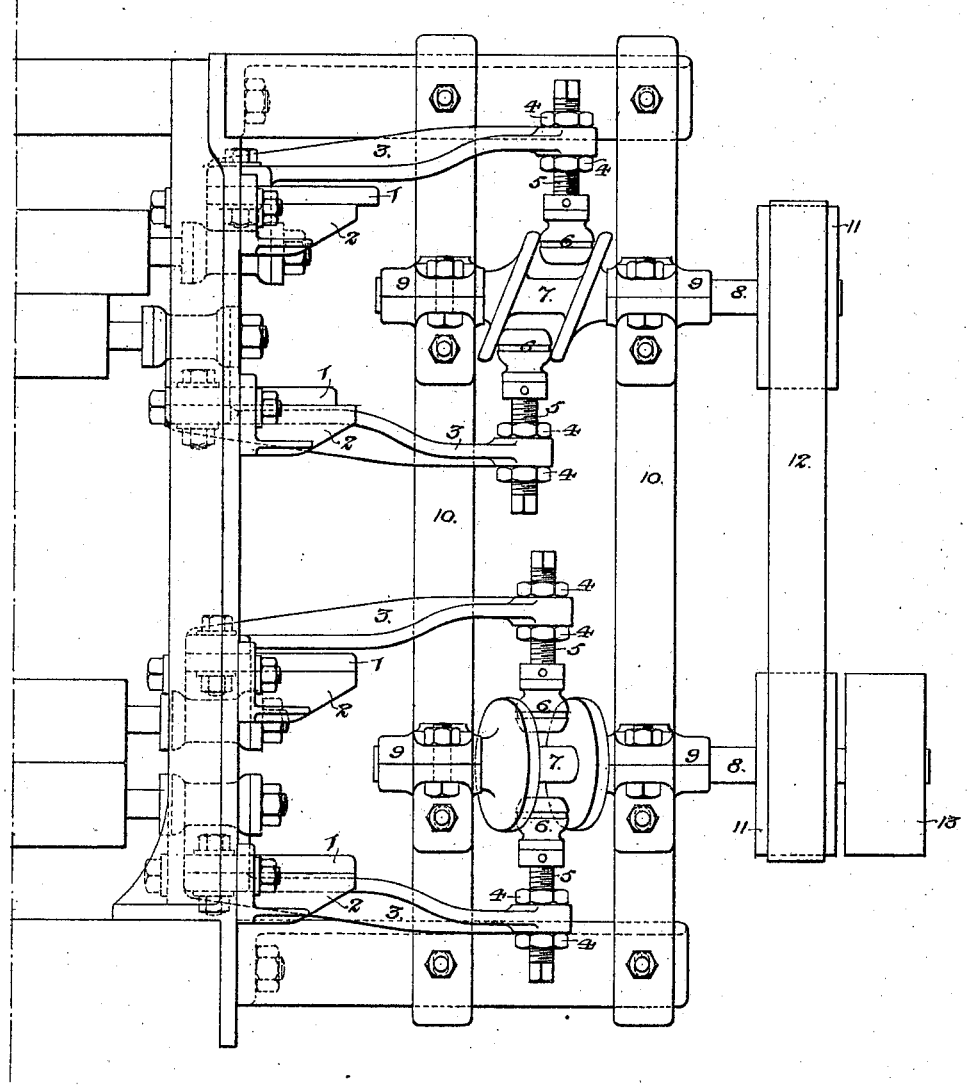

No. 684,129. Patented Oct. 8, 1901.
H. J. TATE.
RECIPROCATING DEVICE FOR RUB ROLL FRAMES OF CARDING MACHINES.
(Application filed July 31, 1900.)

(No Model.) 2 Sheets—Sheet 1.

No. 684,129. Patented Oct. 8, 1901.
H. J. TATE.
RECIPROCATING DEVICE FOR RUB ROLL FRAMES OF CARDING MACHINES.
(Application filed July 31, 1900.)
(No Model.) 2 Sheets—Sheet 2.
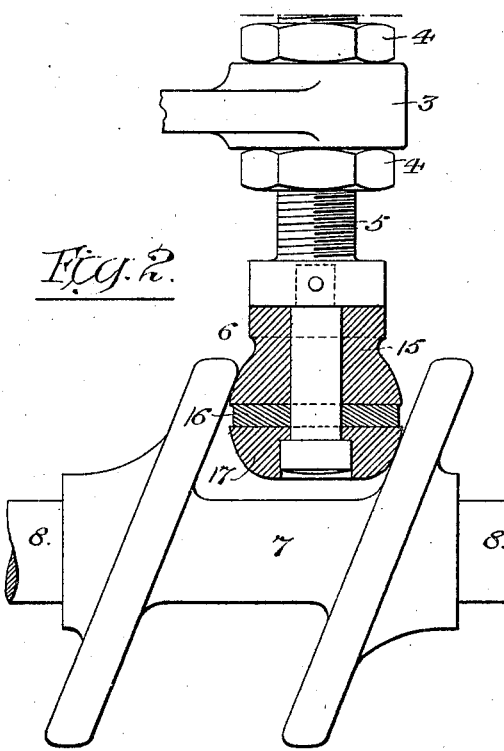
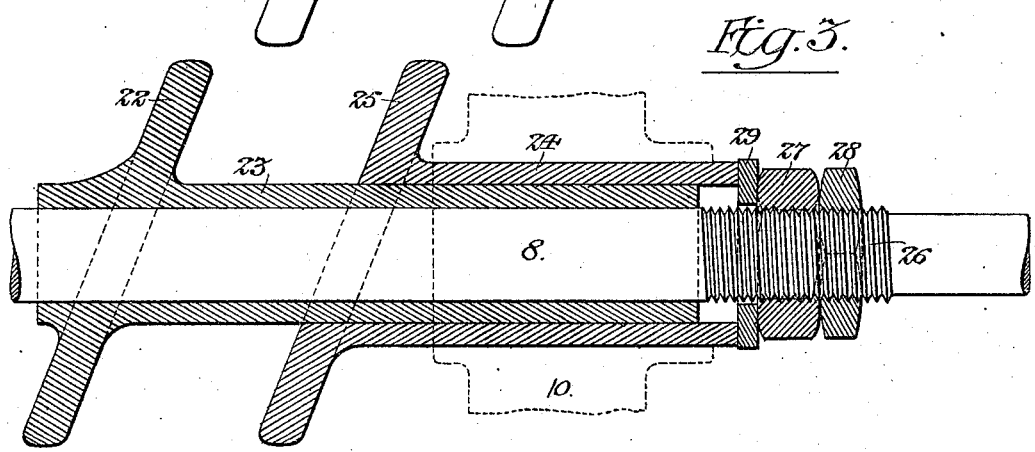
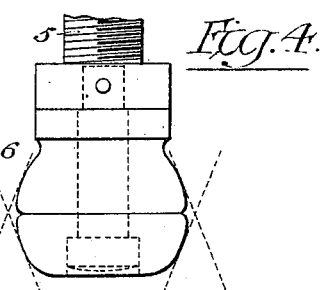

UNITED STATES PATENT OFFICE.

HUGH J. TATE, OF PHILADELPHIA, PENNSYLVANIA.

RECIPROCATING DEVICE FOR RUB-ROLL FRAMES OF CARDING-MACHINES.

SPECIFICATION forming part of Letters Patent No. 684,129, dated October 8, 1901.

Application filed July 31, 1900. Serial No. 25,426. (No model.)

*To all whom it may concern:*

Be it known that I, HUGH J. TATE, a citizen of the United States, residing in Philadelphia, Pennsylvania, have invented certain Improvements in Reciprocating Devices for Rub-Roll Frames of Carding-Machines, of which the following is a specification.

My invention relates to mechanism employed for imparting reciprocating motion to the rubbing-rolls or rubbing-aprons of a carding-machine, the object of my invention being to so construct such mechanism as to simplify the same and provide for a quicker reciprocation of the rubbing rolls or aprons than is possible by the employment of reciprocating devices now in use. This object I attain in the manner hereinafter set forth, reference being had to the accompanying drawings, in which—

Figure 1 represents in side elevation sufficient of the rubbing mechanism of a carding-machine to illustrate my invention. Fig. 2 is an enlarged view, partly in elevation and partly in section, of that portion of the mechanism to which my invention particularly relates. Fig. 3 is a longitudinal section, also on an enlarged scale, illustrating a feature of my invention; and Fig. 4 is a side view illustrating modifications of the invention.

Both the upper and lower sets of rubbing mechanism are shown; but as the two sets of reciprocating devices are precisely alike a description of one will suffice. The shafts of the rubbing rolls or aprons are mounted, as usual, in bearings upon slides 1, supported upon suitable guides 2 on the frame of the machine, and each of these slides has secured to it a projecting arm 3, to the outer end of which is secured, by means of nuts 4 above and below the arm, a threaded stem 5, upon the inner end of which is mounted, so as to rotate freely, an antifriction-roller 6, presenting a curved or convex periphery and preferably composed of sections, as described hereinafter. These antifriction-rollers are engaged by a spool-shaped cam 7, consisting of a central stem or barrel with oblique heads, this cam being secured to or forming part of a short shaft 8, which is adapted to turn in bearings 9, secured to vertical bars 10 on the fixed frame, the outer end of the shaft being provided with a pulley 11 for the reception of a belt 12, whereby it is connected to the corresponding shaft of the other set of reciprocating devices, one of the shafts 8 being also extended for the reception of another pulley 13 for receiving the driving-belt. Both of the oblique heads of the spool-shaped cams are inclined in the same direction, and as the antifriction-roller of one slide 1 engages with the cam on one side of the axis of the same and that of the other slide engages with the cam on the opposite side of its axis it follows that the rotation of the cam will impart reciprocating movement in opposite directions to the said slides—that is to say, when the upper slide is moving inwardly the lower slide will be moving outwardly, and vice versa. As the cam rotates, the angle of the contacting portion of either head in respect to the antifriction-rollers is constantly changing. Hence the curved or convex form of the periphery of the antifriction-rollers, which provides for contact of the acting head of the cam with the face of the roller whatever the angle assumed by the cam.

The extent of reciprocating movement of the rubbing roll or apron carrying slide can be varied by moving the antifriction-roller nearer to or farther from the axis of the cam 7, the extent of movement being least when the roller is nearest to the axis and greatest when the roller is farthest from the axis. Such adjustment of the rollers can be readily effected by manipulating the nuts 4, the roller being rigidly secured in position after adjustment by tightening said nuts upon the arm 3.

The antifriction-roller 6 is preferably composed of a series of sections free to turn independently of each other, because that portion of said antifriction-roller which is in contact with one flange of the cam is caused to rotate in one direction, while that portion of said roller which is in contact with the other flange of the cam must rotate in the opposite direction. For instance, supposing the roller to be composed of three sections 15, 16, and 17, as shown in Fig. 2, the upper section 15 will be in contact with the left-hand flange of the cam when the lower section 17 is in contact with the right-hand flange of the cam. Consequently these two sections of the roller will rotate in opposite directions, and when the cam has been turned so that its flanges occupy the reverse angle the direction of rotation of the sections of the roll will be the reverse.

There is only one point in the rotation of the cam when there is likelihood of its flanges touching both sections 15 and 17 at the same time—that is to say, when the cam is in the mid-position shown at the lower portion of Fig. 1—and to lessen this contact as much as possible I prefer to interpose between the sections 15 and 17 of the cam a narrow central section 16 and to make said section comparatively shallow and of slightly less diameter than the upper and lower sections, so that it will not come into contact with the flanges of the cam. Somewhat the same result might be obtained by making the roller in two sections and slightly reducing the diameter of each section at or near the meeting lines, as shown in Fig. 4.

It may be advisable in many cases to provide for varying the distance between the two flanges of the cam, so as to compensate for wear or for other reasons, and in such case I prefer to construct the cam as shown in Fig. 3. In this case one flange, 22, of the cam is secured to or forms part of a sleeve 23, which is secured to the shaft 8, so as to be compelled to turn therewith, this sleeve being externally of square or other polygonal form or provided with a spline, so as to engage with and turn the hub 24 of the other flange, 25, of the cam, which hub is free to slide longitudinally on the sleeve 23, so as to cause the flanges 22 and 25 to approach or recede from each other. The shaft 8 has a threaded portion 26, to which is adapted a nut 27 and lock-nut 28, the nut 27 bearing upon a washer 29, which in turn bears upon the end of the hub 24, the latter projecting outwardly beyond the end of the sleeve 23, so as to provide any desired range of adjustment.

By my invention I am enabled to dispense with the vertical shaft, eccentrics, and gears usually employed in mechanism for reciprocating rub rolls or aprons of carding-machines and provide instead of the same a simpler and more directly acting device which can be driven at a higher speed than the ordinary reciprocating mechanism.

Having thus described my invention, I claim and desire to secure by Letters Patent—

1. The combination of the slide of a carding-machine which carries the rubbing mechanism, with an oblique flanged cam and a single cam-engaging device carried by the slide consisting of a single spindle having a series of independently-rotatable portions with rounded peripheries, whereby one may be rotated in one direction on the spindle by contact with one portion of the cam, while the other is being rotated at the same time in the opposite direction on the same spindle by contact with another portion of the cam, substantially as specified.

2. The combination of the slide of a carding-machine which carries the rubbing mechanism, with an oblique flanged cam and a cam-engaging device mounted on the slide and adjustable from and toward the axis of the cam, substantially as specified.

3. The combination of the slide which carries the rubbing mechanism of a carding-machine, with a cam consisting of a hub with an oblique flange, a sleeve mounted so as to slide longitudinally on the hub and having an oblique flange parallel with that of said hub, a threaded shaft, a washer bearing on the end of the sleeve, nuts on the threaded shaft, one of said nuts bearing upon said washer, and a single spindle having a series of independently-rotatable portions mounted on the slide, and contained in the space between the flanges whereby one portion may be rotated in one direction and another in the opposite direction at the same time on said spindle, substantially as specified.

In testimony whereof I have signed my name to this specification in the presence of two subscribing witnesses.

HUGH J. TATE.

Witnesses:
JOHN W. TAGGART,
F. E. BECHTOLD.